United States Patent [19]

Elmberg

[11] 4,291,716

[45] Sep. 29, 1981

[54] PILOT STAGE VALVE

[75] Inventor: Dwayne R. Elmberg, Golden Valley, Minn.

[73] Assignee: Honeywell Inc., Minneapolis, Minn.

[21] Appl. No.: 796,650

[22] Filed: May 13, 1977

[51] Int. Cl.³ .............................................. G05D 16/20

[52] U.S. Cl. ............................................. 137/83; 91/3

[58] Field of Search ..................... 137/83, 625.64; 91/3

[56] References Cited

U.S. PATENT DOCUMENTS 3,528,446 9/1970 Horn .......................... 137/625.64 X 3,561,476 2/1971 Mandroian ............................ 137/83

*Primary Examiner*—Alan Cohan

*Attorney, Agent, or Firm*—Trevor B. Joike

[57] ABSTRACT

A pilot stage valve is disclosed having a control mechanism for moving an actuating arm in response to an input signal, a jet pipe moved by the actuating arm for issuing a jet of fluid, a sandwich constructed receiver having a first receiver plate and a second receiver plate, each having a groove in the surface thereof facing each other with a splitter plate between the first and second receiver plates, the first and second grooves receiving a differential amount of fluid dependent upon the position of the jet pipe with respect to the splitter plate, the grooves being connected to respective outlet ports. The control mechanism comprises a magnetic operator having a generally U-shaped frame comprising first and second arms each having first and second ends and a cross-piece attaching the first ends of the first and second arms together, a first rare earth magnet attached to the second end of the first arm, a second rare earth magnet attached to the second end of the second arm, an armature attached to the cross-piece of the frame and extending between the magnets, a coil wound around the armature, and a means for attaching the armature to the actuating arm of the pilot stage valve.

7 Claims, 10 Drawing Figures

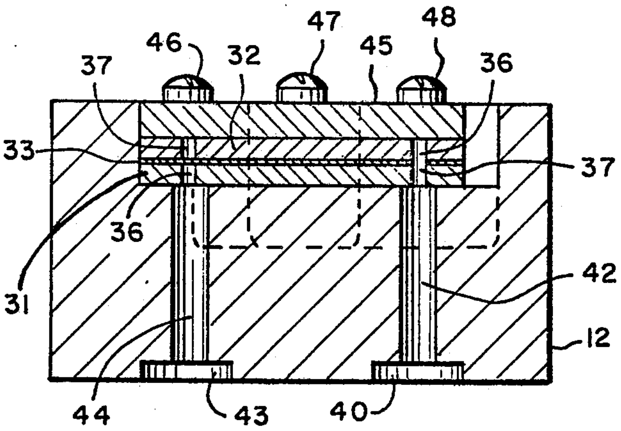
FIG. 5
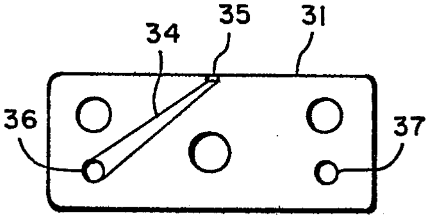
FIG. 3
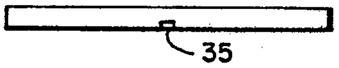
FIG. 4
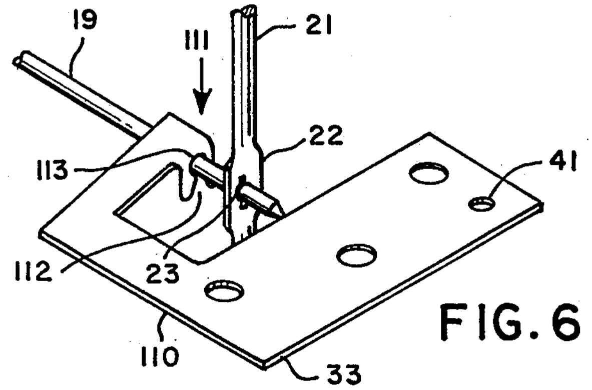
FIG. 6
FIG. 7
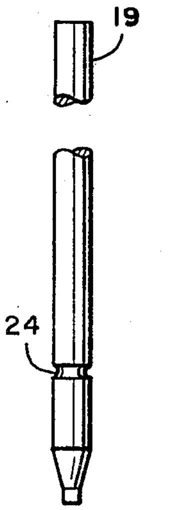
FIG. 8
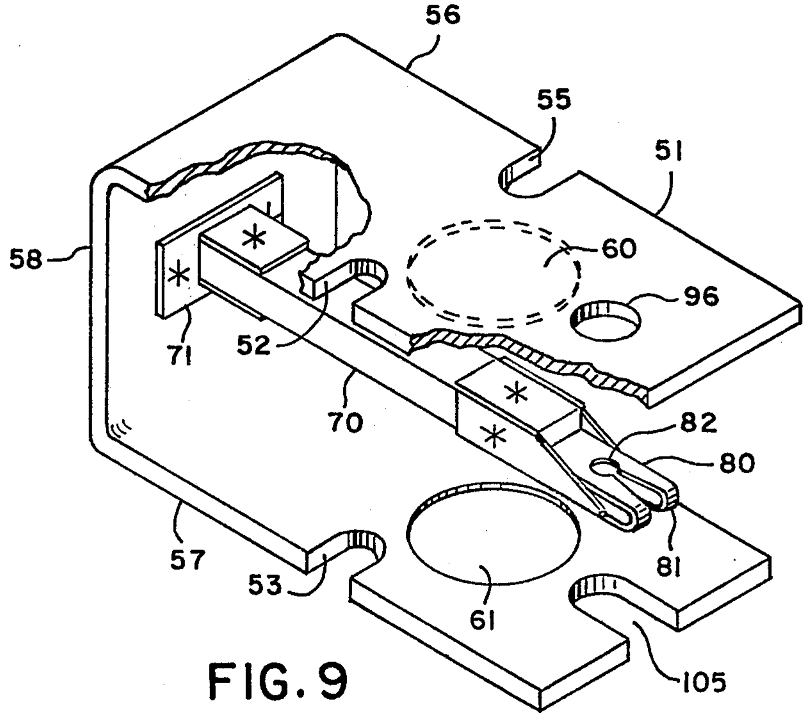
FIG. 9

PILOT STAGE VALVE

BACKGROUND OF THE INVENTION

This invention relates to a pilot stage valve that can be used for controlling servo valves and the like, and more particularly to the magnetic operator and receiving sections for the pilot stage valve.

Typical prior art pilot stage valves include a magnetic operator having north and south magnets, pole pieces and a winding wound around an armature. The winding is energized from an external input signal to magnetize the armature either north or south. Once magnetized, the armature will move away from one magnet to the other depending upon its polarity to control the distance between the armature and one of two input ports. This distance controls the pressure within the input ports which in turn can be used to control the position of a servo valve stage or spool. A feedback mechanism is sometimes connected between the spool of the servo valve and the armature of the magnetic operator section. Such an arrangement is shown in U.S. Pat. No. 3,749,129 issued July 31, 1973.

These prior art valves are bulky and costly to assemble. The pilot stage valve according to the present invention is smaller in size than typical prior art pilot stage valves and is more economical to assemble.

SUMMARY OF THE INVENTION

The pilot stage valve of the present invention includes a control mechanism for moving an actuating arm in response to an input signal, a jet pipe moved by the actuating arm for issuing a jet of fluid, a sandwich construction of a first receiver plate, a splitter plate and a second receiver plate, the first and second receiver plates having grooves on the surfaces thereof which face the splitter plate, wherein the grooves receive a differential amount of fluid from the jet pipe dependent upon the position of the jet pipe with respect to the splitter plate. The control mechanism may comprise a generally U-shaped frame having first and second arms each having first and second ends and a cross-piece attaching the first ends of the first and second arms together, a first rare earth magnet attached at the second end of the first arm and a second rare earth magnet attached to the second end of the second arm, an armature attached to the cross-piece of the frame and extending between the magnets and attached to the actuating arm, and a coil wound around the armature and connected to receive the input signal.

Because the notches in the edge of the receiver plate, for receiving and connecting the fluid issuing from the jet pipe to the grooves, are small, it is important that the jet pipe be held against lateral movement along the edge of the splitter plate facing the jet pipe. Therefore, the splitter plate has a generally U-shaped arm extending from one end thereof wherein one leg of the U-shaped arm is shorter than its opposite leg and terminates in a clip for fastening to the jet pipe to prevent lateral movement.

BRIEF DESCRIPTION OF THE DRAWINGS

These and other features and advantages will become apparent from a detailed consideration of the invention when taken in conjunction with the drawings in which:

FIG. 3 shows the surface topography of the surface of the receiver plates which face the splitter plate of the receiver shown in FIG. 1;

FIG. 4 is a front view of the splitter plate;

FIG. 5 is a cross-sectional view of FIG. 1 taken along line A—A;

FIG. 6 is a fragmentary view of the jet pipe, splitter plate, and actuating arm assembly of the valve shown in FIG. 1;

FIG. 7 shows the jet pipe used in the pilot stage valves;

FIG. 8 is an end view of the jet pipe; and,

FIG. 9 shows the frame and armature for supporting the coil of the magnetic operator of the valve in FIG. 1; and, FIG. 10 shows an alternative construction for the pilot stage valve.

DETAILED DESCRIPTION OF THE DRAWINGS

Figure 1:
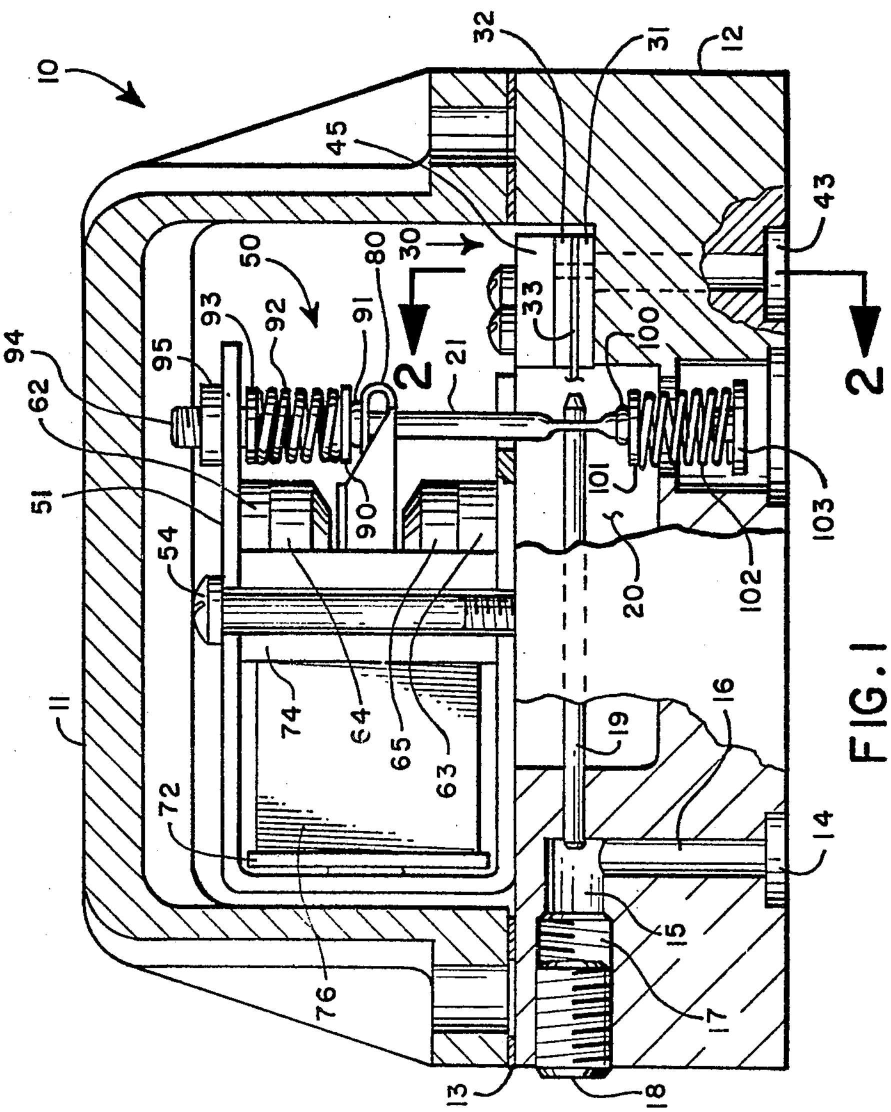
FIG. 1 is a cross-sectional side view of the pilot stage valve according to the present invention.

The pilot stage valve 10 shown in FIG. 1 has cover portion 11 secured by appropriate screws (not shown) to base section 12 and has sealing gasket 13 therebetween. Inlet port 14 communicates with chamber 15 through channel or aperture 16. Chamber 15 also communicates with threaded aperture 17 which has sealing plug 18 therein. Extending through base 12 and suitably secured thereto, as by an adhesive, is hollow jet pipe 19 which communicates with the chamber 15. The other end of the jet pipe 19 is moved vertically within recess 20 of base 12 by actuating arm or push rod 21. As best shown in FIG. 6, jet pipe 19, during assembly, is pushed through aperture 23 in flattened section 22 of push rod 21 until groove 24 (FIG. 7) in jet pipe 19 snaps into aperture 23. Flattened section 22 and aperture 23 act as a clip to secure jet pipe 19 to actuating arm 21.

Fluid is supplied to chamber 15 under pressure from a source connected to port 14 and travels from chamber 15 through jet pipe 19 and out of jet pipe 19 to receiver section 30. The receiver section comprises first and second receiver plates 31 and 32 with a splitter plate 33 sandwiched therebetween. Receiver plate 31 is shown in more detail in FIGS. 3 and 4 and comprises a plate having groove 34 cut in the surface of receiver plate 31 facing splitter plate 33. The groove extends from notch 35 at the edge of the receiver plate and extends to aperture 36 through the receiver plate. Receiver plate 32 is identical to receiver plate 31 and the two receiver plates are positioned with respective grooves 34 facing one another separated by splitter plate 33 and with their respective notches 35 directed towards the end of jet pipe 19 for receiving fluid therefrom. The receiver plates have an additional aperture extending therethrough at 37.

As better shown in FIG. 5, aperture 36 of receiver plate 32 overlies aperture 37 of receiver plate 31. Also, aperture 37 of receiver plate 32 overlies aperture 36 of receiver plate 31. With this construction, groove 34 of receiver plate 31 extends from its notch 35 to its aperture 36 whereas groove 34 of receiver plate 32 extends from its notch 35 to its aperture 36. Aperture 36 of receiver plate 32 communicates with outlet port 40 through aperture 41 in splitter 33, aperture 37 in receiver plate 31 and channel 42 in base 12. Likewise, aperture 36 in receiving plate 31 communicates with corresponding outlet port 43 through channel 44 in base 12. It is to be noted that splitter plate 33 has no corresponding aperture to communicate aperture 37 of receiver plate 32 with aperture 36 of receiver plate 31 since groove 34 of receiver plate 31 communicates with port 43 through aperture 36 of receiver plate 31 and channel 44 without going through the splitter plate. Cover and sealing plate 45 is secured over the sandwiched construction of receiver plates 31 and 32 and splitter plate 33 by suitable screws 46, 47 and 48 which extends through suitable holes in cover plate 45, receiver plate 32, splitter plate 33 and receiver plate 31 and finally into base 12.

Figure 2:
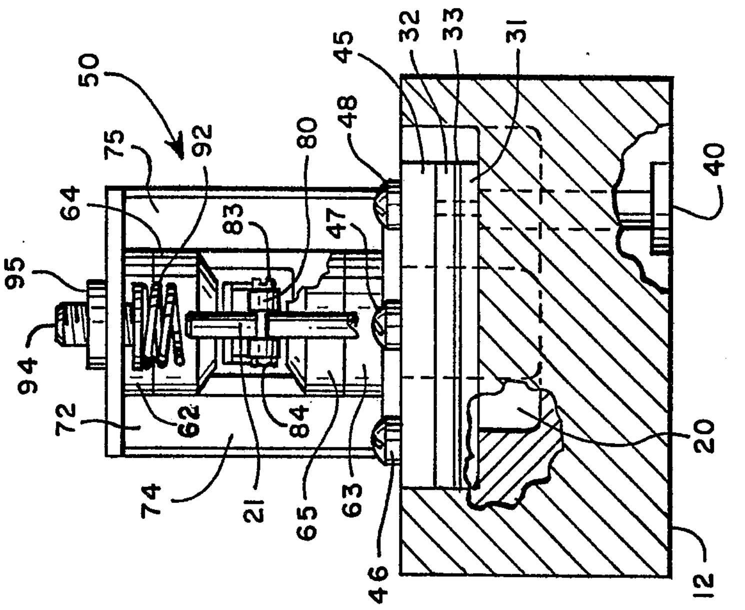
FIG. 2 is a partial cross-sectional front view of the valve shown in FIG. 1 but without the cover.

Fluid issuing from jet pipe 19 impinges onto notches 35 of receiving plates 31 and 32 and will travel along corresponding grooves 34 and then down respective channels 42 and 44 to respective ports 40 and 43. If the jet tube 19 is midway between notches 35 of receiver plates 31 and 32, an equal amount of fluid will be received at outlet ports 40 and 43. If the jet tube 19 is moved in an upward direction, outlet port 40 will receive a greater proportion of the fluid and, if jet tube 19 is moved in a downward direction from its midposition, outlet port 43 will receive a greater proportion of the fluid. Jet pipe 19 is moved vertically with respect to the receiving assembly 30 by the push rod or actuating arm 21. Actuating arm 21 is driven by a control mechanism or magnetic operator 50 shown in FIGS. 1 and 2.

Assembly 50 comprises generally U-shaped frame 51 of a low hysteresis magnetic flux conducting material. The frame is shown in more detail in FIG. 9 and has appropriate slots 52 and 53 for receiving screw 54, and slot 55 and a corresponding slot below 55 for receiving a second screw corresponding to screw 54. Frame 51 has first arm 56 and second arm 57 connected together at their ends by cross-piece 58. In the preferred embodiment, frame 51 is a unitary piece which is stamped and bent in the generally U-shaped fashion as shown. Arm 56 has recess 60 therein and arm 57 has corresponding recess 61. Rare earth-cobalt magnet 62 having a first polarity is set into recess 60 and will be held thereto by its magnetic attraction for frame 51. Second rare earth-cobalt magnet 63 of opposite polarity is inserted into recess 61 and will be held thereto by its magnetic attraction for frame 51. Pole pieces 64 and 65 are respectively associated with and attached to magnets 62 and 63 by suitable means such as an adhesive. The magnetic circuit structure is completed by armature 70 which is suitably attached to cross-piece 58 of frame 51. As shown, armature 70 is welded to bracket 71 which is in turn welded to cross-piece 58 of frame 51.

Bobbin 72 is inserted over armature 70 and has corresponding U-shaped ends 74 and 75 aligned with the corresponding slots 52, 53 and 55 of frame 51 for receiving corresponding screws 54. Screws 54 thus secure control mechanism or magnetic operator 50 to base 12. Finally, winding 76 is wound around 72 and is suitably supplied with a pair of terminals (not shown) for receiving an input signal from an external source. Depending upon the polarity of the signal applied to winding 76, the armature will be either driven away from pole piece 64 to pole piece 65 or driven away from pole piece 65 to pole piece 64.

Armature 70 has a clip 80 as shown for securing armature 70 to push rod 21. Push rod 21 is inserted through slot 81 of clip 80 into the aperture 82 therein. Thereafter, screw 83 is inserted between the front portion of clip 80 and push rod 21 and a nut 84 is secured over the screw 83 to pinch clip 80 against push rod 21. Thus, push rod 21 cannot slide with respect to armature 70 but is instead driven by armature 70.

The upper end of push rod 21 has bulge 91 for butting against washer 90 which in turn butts against spring 92. The spring 92 pushes against washer 93 which is suitably attached to one end of screw 94. Screw 94 extends through press nut 95 which is pressed through aperture 96 of frame 51. Screw 94 may be driven by a suitable wrench, such as a hex key wrench, for biasing push rod 21 and armature 70 in a vertical direction.

At the lower end of push rod 21 is bulge 100 which butts against washer 101 which in turn butts against feedback spring 102. Feedback button 103 may be connected to a suitable feedback mechanism on the servo valve which is being controlled by pilot valve 10 for providing a feedback function. Biasing spring 92 and adjustment screw 94 are utilized to center jet tube 19 with respect to splitter plate 33 when no input is supplied to coil 76. Push rod 21 extends through a suitable slot 105 in frame 51.

In operation, with no input signal applied to coil 76, the fluid issuing from jet pipe 19 will be divided by splitter plate 33 to both receiving plates 31 and 32 so that outlet ports 40 and 43 receive equal amounts of fluid. As an input signal is applied to coil 76 of one polarity, armature 70 will be driven up pulling jet pipe 19 up to increase the flow to outlet port 40 and decrease the flow to outlet port 43. If an opposite polarity signal is supplied to the coil 76, armature 70 is driven downward to correspondingly drive jet pipe 19 down to increase the fluid flow to outlet port 43 and decrease the fluid flow to outlet port 40.

Splitter plate 33 has generally U-shaped retaining arm 110 extending from one side thereof. One leg of U-shaped arm 110 is shorter than its opposite leg and terminates in clip 111. Clip 111 is formed of a V-shaped notch 112 with an aperture 113 at the apex of the V. During assembly, clip 111 is bent down until jet pipe 19 snaps into aperture 113. In this manner, jet pipe 19 is retained against lateral motion along the edge of splitter plate 33 facing jet pipe 19 and is allowed only vertical motion across splitter plate 33 and receiver plates 31 and 32.

Figure 10:
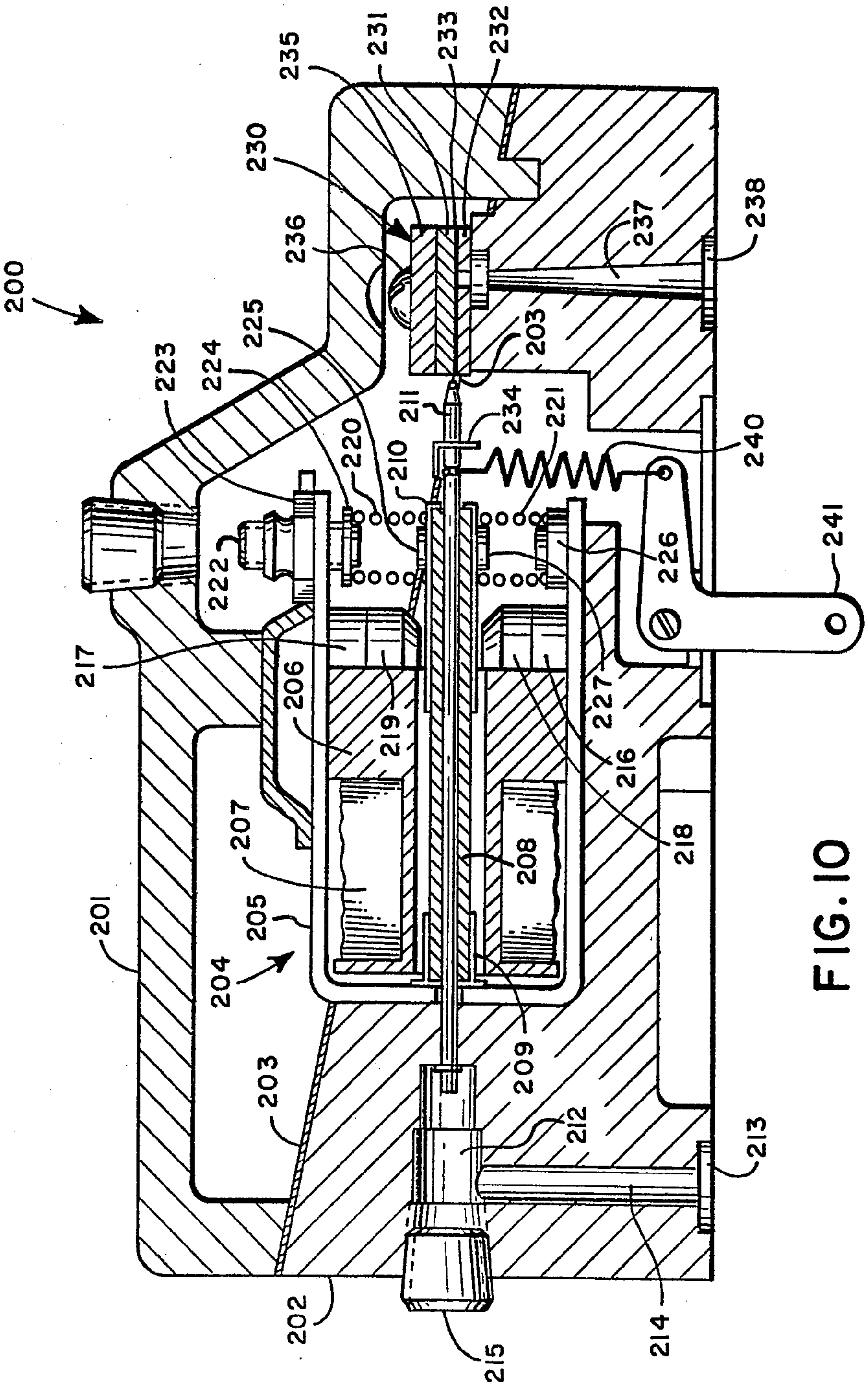

An alternative pilot stage valve 200 is shown in FIG. 10 which is basically the same type of construction as that shown in FIGS. 1–9 but with the jet pipe running through the armature instead of being connected to the armature by pusher 21. Specifically, pilot stage valve 200 has a cover 201 which fits over base section 202 with gasket 203 for sealing. Magnetic arrangement 204 is essentially the same as shown in FIGS. 1–9 but, in FIG. 10, is shown in partial cross section. Specifically, magnetic structure 204 comprises a generally U-shaped frame 205 having a bobbin 206 and winding 207 wound therearound. Through a center hole in bobbin 206 is mounted armature 208 attached to frame 205 by bracket 209. Clip 210 is inserted over the end of armature 208 and jet pipe 211 extends through the armature 208 and through base section 202 to chamber 212. Chamber 212 is connected to input port 213 by channel 214. Plug 215 seals chamber 212. The magnetic structure 204 also comprises magnets 216 and 217 with pole pieces 218 and 219. Armature 208 is biased by springs 220 and 221. Spring 220 is adjustable by screw 222 fitted through nut 223. Spring 220 is centered about plate 224 and projection 225. Spring 221 is centered by plate 226 and projection 227. Hydraulic fluid or other fluid is supplied through port 213 to chamber 212 and from there flows through jet pipe 211 and out of jet pipe 211 to receiving section 230.

Receiver section 230 comprises receiver plates 231 and 232 with a splitter plate 233 of the same construction as shown in FIGS. 1–9. Splitter plate 233 terminates in a clip 234 which secures jet pipe 211 against transverse movement. Receiving section 230 has a cover plate 235 and the entire assembly is fastened to base 202 by screw 236. Channel 237 communicates one of the receiving plates 231 or 232 to an outlet port 238. The other receiving plate is connected in the manner shown in FIGS. 1–9 to a second output port.

A feedback arrangement may comprise spring 240 hooked over a groove in jet pipe 211, such as groove 24 in jet pipe 19 of FIG. 7, and is attached to its other end to a crank arm 241.

As can be seen, the arrangement shown in FIG. 10 has the benefit that the jet pipe is controlled directly by the armature without any intervening mechanical linkage.

The embodiments of the invention in which an exclusive property or right is claimed are defined as follows:

1. A pilot stage valve for connecting fluid from an inlet port to first and second outlet ports comprising:
- control means for moving an actuating means in response to an input signal;
- a jet pipe connected to said inlet port and attached to said actuating means for issuing a jet of fluid; and,
- receiver means for receiving said jet of fluid, said receiver means comprising a sandwich construction of
  - a first receiver plate having a first opening for communicating said jet of fluid to said first outlet port,
  - a second receiver plate having a second opening for communicating said jet of fluid to said second outlet port, and,
  - a splitter plate between said first and second receiver plates,
- said splitter plate having an extension therefrom and attached to said jet pipe for preventing lateral movement of said jet pipe with respect to said receiver means;
- wherein said first and second openings receive a differential amount of fluid dependent upon the position of said jet pipe with respect to said splitter plate.

2. The pilot stage valve of claim 1 wherein said extension of said splitter plate and said splitter plate are of a unitary construction.

3. The pilot stage valve of claim 2 wherein said splitter plate and said extension are formed by a stamped or etched sheet of metal.

4. The pilot stage valve of claim 3 wherein said extension has a clip at the end thereof for attachment to said jet pipe.

5. The pilot stage valve of claim 4 wherein said clip is formed by a V-shaped notch in the end of said extension and by an aperture of the apex of said V, said clip being bent over said jet pipe until said jet pipe snaps into said aperture.

6. The pilot stage valve of claim 1 wherein said extension has a clip at the end thereof for attachment to said jet pipe.

7. The pilot stage valve of claim 6 wherein said clip is formed by a V-shaped notch in the end of said extension and by an aperture at the apex of said V, said clip being bent over said jet pipe until said jet pipe snaps into said aperture.

* * * * *